(12) United States Patent
Taniuchi et al.

(10) Patent No.: US 11,862,820 B2
(45) Date of Patent: Jan. 2, 2024

(54) SOLID-STATE BATTERY

(71) Applicant: HONDA MOTOR CO., LTD., Tokyo (JP)

(72) Inventors: Takuya Taniuchi, Saitama (JP); Masahiro Ohta, Saitama (JP); Toshiyuki Ariga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/577,355

(22) Filed: Jan. 17, 2022

(65) Prior Publication Data
US 2022/0231385 A1     Jul. 21, 2022

(30) Foreign Application Priority Data

Jan. 20, 2021    (JP) ................................ 2021-007085

(51) Int. Cl.
*H01M 50/538*     (2021.01)
*H01M 50/536*     (2021.01)
(Continued)

(52) U.S. Cl.
CPC ......... *H01M 50/538* (2021.01); *H01M 4/762* (2013.01); *H01M 50/536* (2021.01);
(Continued)

(58) Field of Classification Search
CPC ............. H01M 50/538; H01M 50/536; H01M 50/107; H01M 50/531; H01M 4/762;
(Continued)

(56) References Cited

U.S. PATENT DOCUMENTS 2,315,592 A * 4/1943 Cargill ................ H01M 50/559
429/170
3,841,914 A * 10/1974 Boyle ..................... H01M 6/46
429/153
(Continued)

FOREIGN PATENT DOCUMENTS

JP     2000106154 A     4/2000
JP     6524386 B1 *     6/2019
JP     2021099958 A *     7/2021

OTHER PUBLICATIONS

English Translation of JP2021099958 A; All solid state lithium ion secondary battery; Nissan; Jul. 1, 2021 (Year: 2021).*
(Continued)

*Primary Examiner* — Matthew T Martin
*Assistant Examiner* — Adam J Francis
(74) *Attorney, Agent, or Firm* — CKC & Partners Co., LLC

(57) ABSTRACT

To provide a solid-state battery capable of achieving high capacity. A solid-state battery including a multilayer body including a stack of a plurality of electrode layers including positive electrode layers and negative electrode layers and solid electrolyte layers each disposed between the electrode layers, the multilayer body having a columnar shape; and the solid-state battery including a positive electrode terminal and a negative electrode terminal disposed at both end portions of the multilayer body; a positive electrode tab electrically connected to the positive electrode layer and the positive electrode terminal; and a negative electrode tab electrically connected to the negative electrode layer and the negative electrode terminal, wherein the positive electrode tab and the negative electrode tab are spirally wound on an outer peripheral surface of the multilayer body.

8 Claims, 6 Drawing Sheets

(51) Int. Cl.
*H01M 4/76* (2006.01)
*H01M 10/0562* (2010.01)
*H01M 10/0525* (2010.01)
*H01M 4/86* (2006.01)
*H01M 50/531* (2021.01)

(52) U.S. Cl.
CPC ...... *H01M 4/8605* (2013.01); *H01M 10/0525* (2013.01); *H01M 10/0562* (2013.01); *H01M 50/531* (2021.01)

(58) Field of Classification Search
CPC .......... H01M 4/76; H01M 4/661; H01M 4/66; H01M 4/80; H01M 4/8605; H01M 4/86; H01M 10/0431; H01M 10/04; H01M 10/0562; H01M 10/0525
See application file for complete search history.

(56) References Cited

U.S. PATENT DOCUMENTS

| | | | | |
|---|---|---|---|---|
| 5,458,989 | A | * | 10/1995 | Dodge ................ H01M 8/1007 429/492 |
| 11,316,168 | B2 | * | 4/2022 | Lee .......................... H01M 4/78 |
| 2014/0030569 | A1 | * | 1/2014 | Kwon .................. H01M 10/05 429/94 |
| 2019/0058223 | A1 | * | 2/2019 | Uhm ..................... H01M 4/667 |

OTHER PUBLICATIONS

English Translation of JP6524386B1; Spiral type secondary battery; Jun. 5, 2019 (Year: 2019).*

U.S. Pat. No. 2,315,592; Leakproof dry cell; provided with annotations for citation purposes; Apr. 6, 1943 (Year: 1943).*

\* cited by examiner

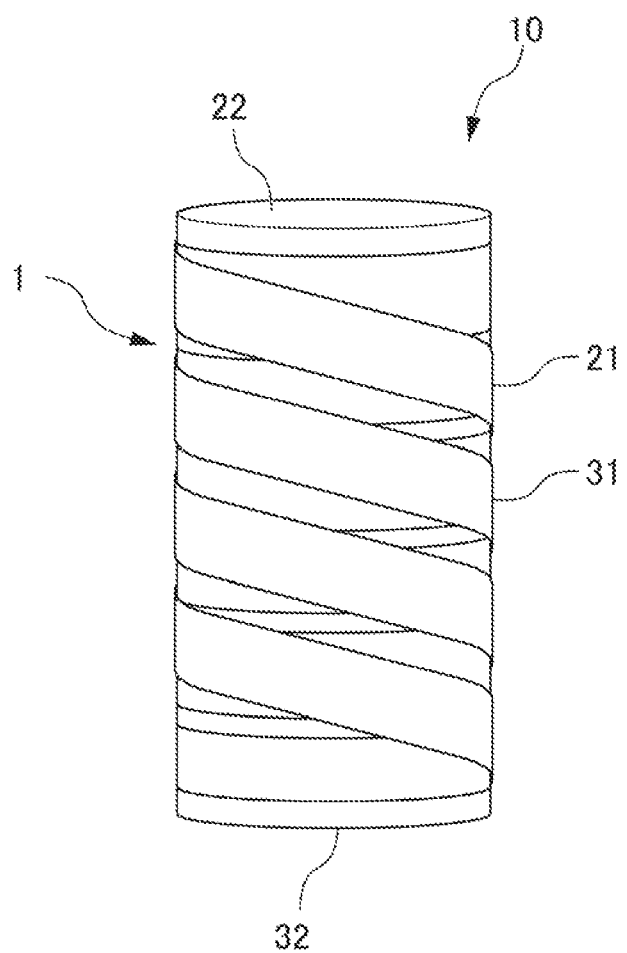

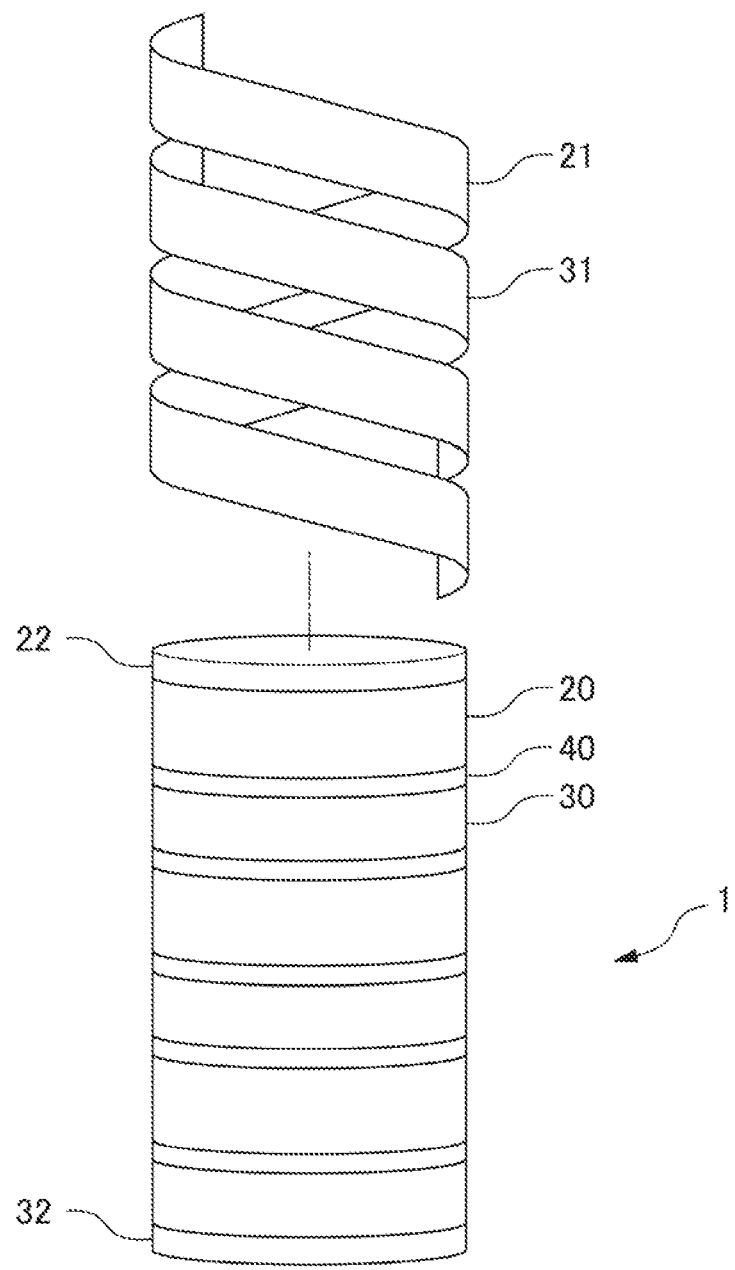

SOLID-STATE BATTERY

This application is based on and claims the benefit of priority from Japanese Patent Application No. 2021-007085, filed on 20 Jan. 2021, the content of which is incorporated herein by reference.

BACKGROUND OF THE INVENTION

Field of the Invention

The present invention relates to a solid-state battery.

Related Art

Conventionally, lithium ion secondary batteries have been becoming widespread as secondary batteries having high energy density. A lithium ion secondary battery has a structure including a positive electrode, a negative electrode, a separator interposed between the positive electrode and the negative electrode, and a liquid electrolyte being filled therein.

Since an electrolytic solution in the lithium ion secondary battery is usually a flammable organic solvent, in particular, safety against heat has often been a problem. Then, a solid-state battery using an inorganic-based solid electrolyte instead of an organic-based liquid electrolyte has been proposed (see Patent Document 1).

Patent Document 1: Japanese Unexamined Patent Application, Publication No. 2000-106154

SUMMARY OF THE INVENTION

In conventional secondary batteries such as a lithium ion secondary battery including a liquid electrolyte, a battery cell having a columnar shape and having a large capacity can be produced by stacking and winding a pair of electrodes composed of a positive electrode and a negative electrode coated with an active material, and filling the inside of the obtained cylindrical-shaped wound body with an electrolytic solution.

A solid-state battery housed in a cylindrical outer body has an advantage that stress is not concentrated on the corner portion, and, therefore, restraining pressure can be uniformly applied as compared with, for example, a solid-state battery housed in an outer body having a rectangular tube shape. In a case of a solid-state battery, it is difficult to produce a wound body because an electrode is hard and fragile. Therefore, when a multilayer body including a plurality of electrodes is housed in a cylindrical-shaped outer body, it is required to have a structure of series connection. Therefore, since the cell has a high voltage and a small capacity, it is necessary to provide an insulating component accompanying the increase in voltage. Furthermore, in order to increase the capacity by connecting a plurality of cells in parallel, it is necessary to install connectors or the like in parallel in number of parallel connections. Therefore, there has been a problem that the number of components is increased, resulting in lowering the energy density per module unit.

The present invention has been made in view of the above, and has an object to provide a solid-state battery capable of achieving high capacity.

(1) The present invention relates to a solid-state battery including a multilayer body including a stack of a plurality of electrode layers including positive electrode layers and negative electrode layers and solid electrolyte layers each disposed between the electrode layers, the multilayer body having a columnar shape; and the solid-state battery including a positive electrode terminal and a negative electrode terminal disposed at both end portions of the multilayer body; a positive electrode tab electrically connected to the positive electrode layer and the positive electrode terminal; and a negative electrode tab electrically connected to the negative electrode layer and the negative electrode terminal, in which the positive electrode tab and the negative electrode tab are spirally wound on an outer peripheral surface of the multilayer body.

The invention of (1) can provide a solid-state battery capable of achieving high capacity.

(2) The solid-state battery described in (1), wherein the positive electrode tab and the negative electrode tab have an at least partially insulated surface or a surface at least partially covered with an insulator.

The invention of (2) can prevent short-circuit of a solid-state battery, and can improve the safety of the solid-state battery.

(3) The solid-state battery described in (1) or (2), wherein the positive electrode layer and the negative electrode layer include a current collector made of a metal porous body.

The invention of (3) makes it possible to easily connect the electrode tab to each electrode layer by welding.

(4) The solid-state battery described in (3), wherein the positive electrode tab and the negative electrode tab are welded to the current collector.

The invention of (4) makes it possible to easily and strongly connect the electrode tab to each electrode layer.

(5) The solid-state battery described in (4), wherein a material mixture unfilled portion, in which the current collector is not filled with an electrode material mixture, is provided in the outer periphery in the diameter direction of the electrode layers, and the positive electrode tab and the negative electrode tab are welded to the current collector in the material mixture unfilled portion.

The invention of (5) makes it possible to easily and reliably connect the electrode tab to each electrode layer by welding.

(6) The solid-state battery described in any one of (1) to (5), wherein an insulator is disposed on at least an outer peripheral surface of the multilayer body, in which the positive electrode tab and the negative electrode tab are not disposed.

The invention of (6) can prevent the positive electrode tab and the negative electrode tab from being brought into contact with each other and being short-circuited, and can apply uniform restraining pressure to the multilayer body.

BRIEF DESCRIPTION OF THE DRAWINGS

FIG. 1 is a perspective view showing a solid-state battery in accordance with a first embodiment of the present invention;

FIG. 2 is an exploded perspective view showing the solid-state battery in accordance with the first embodiment of the present invention;

DETAILED DESCRIPTION OF THE INVENTION

Figure 3A:
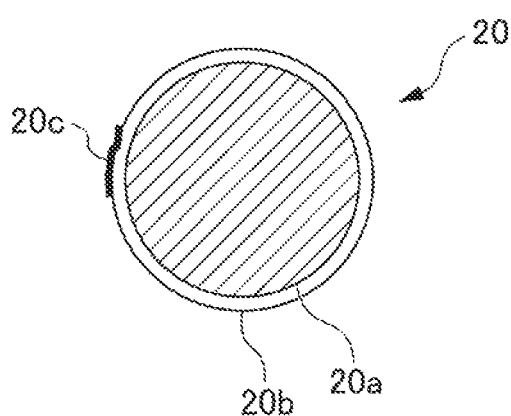
FIG. 3A is sectional views showing an electrode layer in accordance with an embodiment of the present invention.

Hereinafter, embodiments of the present invention will be described with reference to the drawings. However, the embodiments shown below are to exemplify the present invention, and the present invention is not to be limited to the following description.

<<First Embodiment>>
<Solid-State Battery>

A solid-state battery 10 in accordance with this embodiment, as shown in FIG. 1, includes a multilayer body 1 having a columnar shape, a positive electrode tab 21 and a negative electrode tab 31 spirally wound on an outer peripheral surface of the multilayer body 1, and a positive electrode terminal 22 and a negative electrode terminal 32 disposed at both end portions of the multilayer body 1. These are housed in a cylindrical-shape outer body (not shown). In this embodiment, the solid-state battery 10 is a solid-state lithium ion secondary battery capable of being charged and discharged by absorbing and releasing lithium ions and electrons.

(Multilayer Body)

A multilayer body 1, as shown in FIG. 2, is formed by laminating a positive electrode layer 20, a negative electrode layer 30, and a solid electrolyte layer 40 disposed between the positive electrode layer 20 and the negative electrode layer 30 each having a columnar shape. In this embodiment, the positive electrode layer 20 is disposed on one laminate end portion of the multilayer body 1, and the negative electrode layer 30 is disposed on the other laminate end portion of the multilayer body 1.

[Electrode Layer]

Figure 3B:
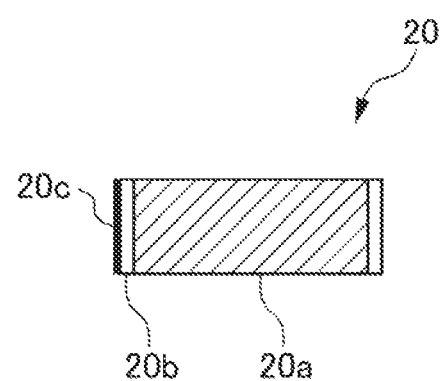
FIG. 3B is sectional views showing an electrode layer in accordance with an embodiment of the present invention.

Electrode layers including a positive electrode layer 20 and a negative electrode layer 30 have a columnar shape, and is formed by filling at least a part of a current collector made of a metal porous body with an electrode material mixture. Hereinafter, the positive electrode layer 20 is described as an example, but the same is true to the negative electrode layer 30 having the same configuration. FIG. 3A and FIG. 3B are sectional views showing the positive electrode layer 20 as the electrode layer. FIG. 3A is a sectional view of the positive electrode layer 20 in the diameter direction, and FIG. 3B is a sectional view of the positive electrode layer 20 in the axial direction. As shown in FIG. 3A and FIG. 3B, the positive electrode layer 20 includes a material mixture filled portion 20a having a current collector filled with an electrode material mixture in the center portion of the diameter direction. Furthermore, the positive electrode layer 20 includes a material mixture unfilled portion 20b in which the current collector is not filled with an electrode material mixture in the outer periphery in the diameter direction. A part of the material mixture unfilled portion 20b is provided with a welded portion 20c welded to a positive electrode tab 21. By providing the material mixture unfilled portion 20b with the welded portion 20c, the positive electrode tab 21 and the positive electrode layer 20 can be welded easily and reliably. Note here that when the electrode layer does not include a material mixture unfilled portion, a welded portion to a tab may be provided in the material mixture filled portion.

The material mixture unfilled portion 20b may be formed in a part of the outer periphery in the diameter direction of the positive electrode layer 20, but the material mixture unfilled portion 20b is preferably formed over the entire circumference of the outer periphery in the diameter direction of the positive electrode layer 20. Thus, when the multilayer body 1 is housed in the outer body, pressure can be uniformly applied to the positive electrode layer 20 from the side surface in the circumferential direction. The material mixture unfilled portion 20b has a metal density being preferably higher than that of the material mixture filled portion 20a. Furthermore, the material mixture unfilled portion 20b may be filled with any one of an insulating material, a solid electrolyte, and a heat conductive material. When the material mixture unfilled portion 20b is filled with an insulating material or a solid electrolyte, an internal short circuit of the solid-state battery 10 can be prevented. Furthermore, when the material mixture unfilled portion 20b is filled with a heat conductive material, the dissipation efficiency of heat generated in the electrode layers to the outside can be improved.

Examples of the insulating material capable of being filled into the material mixture unfilled portion 20b include a synthetic resin, and the like. The synthetic resin is not particularly limited, and examples thereof include a thermosetting resin such as a polyimide resin, an epoxy resin, a silicone resin, a polyurethane resin, and the like; a thermoplastic resin such as a polyolefin resin, a polystyrene resin, a fluorine resin, a polyvinyl chloride resin, a polymethacrylic acid resin, a polyurethane resin, and the like; and a photocurable resin such as a silicone resin, a polymethacrylic acid resin, a polyester resin, and the like. As the solid electrolyte, the same materials as the solid electrolyte materials to be used for the below-mentioned solid electrolyte layer 40 are used. Examples of the heat conductive material include high-thermal conductive PC (polycarbonate) resin, high-thermal conductive polybutylene terephthalate (PBT) resin, a high-thermal conductive polyamide (PA) resin, a polyphenylene sulfide (PPS) resin, and the like, and further examples include high-thermal conductive resin materials such as a high-thermal conductive silicone materials having thermal conductivity of 30 W/mK or more.

Both the positive electrode layer 20 and the negative electrode layer 30 may have a material mixture unfilled portion. Furthermore, only one of the positive electrode layer 20 and the negative electrode layer 30 may have a material mixture unfilled portion. When only one of the positive electrode layer 20 and the negative electrode layer 30 has a material mixture unfilled portion, it is preferable that the positive electrode layer 20 has a material mixture unfilled portion. Thus, since the material mixture filled portion of the positive electrode layer 20 is smaller than the material mixture filled portion of the negative electrode layer 30, it is possible to suppress precipitation of lithium due to concentration of electric current on the end portion of the negative electrode layer 30.

[Current Collector]

A current collector constituting the positive electrode layer 20 and the negative electrode layer 30 is made of a metal porous body. The metal porous body includes mutually continuous pores. The inside of the pores can be filled with an electrode material mixture including an electrode active material. The above-mentioned metal porous body is not particularly limited as long as it includes mutually continuous pores, and examples thereof include foam metals having pores, metal mesh, expanded metal, a punched metal, a metal nonwoven fabric, and the like, having pores formed by foaming. Examples of metal to be used for the metal porous body is not particularly limited as long as it has conductivity, and examples thereof include nickel, aluminum, stainless steel, titanium, copper, silver, and the like. Among them, foamed aluminum, foamed nickel, and foamed stainless steel are preferably used as the current collector constituting the positive electrode, and foamed copper and foamed stainless steel are preferably used as the current collector constituting the negative electrode.

The current collector as the metal porous body includes mutually continuous pores inside thereof, and has a larger surface area than that of a metal foil as a conventional current collector. Use of the above-mentioned metal porous body for the current collector makes it possible to fill the electrode material mixture including the electrode active material with the inside of the above-mentioned pores. Thus, the amount of active materials per unit area of the electrode layer can be increased, and as a result, the volumetric energy density of the solid-state battery can be improved. Furthermore, since the electrode material mixture can be fixed easily, unlike conventional electrodes using a metal foil for the current collector, it is not necessary to increase the viscosity of coating slurry forming an electrode material mixture layer for increasing a film thickness of the electrode material mixture layer. This can decrease a binding agent such as an organic polymer compound required for increasing viscosity. Therefore, it is possible to increase capacity per unit area of the electrode, and to achieve high capacity in a solid-state battery. Furthermore, use of the metal porous body for the current collector makes it possible to secure strength of the electrode layer. Therefore, the positive electrode tab and the negative electrode tab can be easily welded to each electrode layer, which has been difficult in a conventional electrode layer in which a current collecting foil is coated with an electrode material mixture.

[Electrode Material Mixture]

An electrode material mixture filled in a current collector as a metal porous body includes at least an electrode active material. The electrode material mixture that can be applied for this embodiment may include arbitrary other components as long as the electrode material mixture includes an electrode active material as an essential component. Other components are not particularly limited, and may use components that can be used for producing a solid-state battery can be used. For example, a solid electrolyte, a conductive auxiliary agent, a binding agent, and the like, can be included.

The positive electrode material mixture constituting the positive electrode layer 20 contains at least a positive electrode active material, and may contain other components such as a solid electrolyte, a conductive auxiliary agent, and a binding agent. The positive electrode active material is not particularly limited as long as it can absorb and release lithium ions. Examples thereof include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, sulfur, and the like.

The negative electrode material mixture constituting the negative electrode layer 30 contains at least a negative electrode active material, and may contain other components such as a solid electrolyte, a conductive auxiliary agent, and a binding agent. The negative electrode active material is not particularly limited as long as it can absorb and release lithium ions, and examples thereof include metallic lithium, a lithium alloy, metal oxide, metal sulfide, metal nitride, Si, SiO, and carbon materials such as an artificial graphite, natural graphite, hard carbon, and soft carbon.

[Solid Electrolyte]

A solid electrolyte layer 40 is laminated between the positive electrode layer 20 and the negative electrode layer 30. The solid electrolyte layer 40 is a layer containing at least a solid electrolyte material. Charge transfer between the positive electrode active material and the negative electrode active material can be carried out through the solid electrolyte material. The solid electrolyte is not particularly limited and well-known solid electrolyte that can be used for the solid-state battery can be used. Examples thereof include a sulfide solid electrolyte material, an oxide solid electrolyte material, a nitride solid electrolyte material, a halide solid electrolyte material, and the like.

(Electrode Tab)

A positive electrode tab 21 and a negative electrode tab 31 as electrode tabs are a belt-like member spirally wound on the outer peripheral surface of a columnar-shaped multilayer body 1 as shown in FIGS. 1 and 2. The positive electrode tab 21 is welded and electrically connected to all the positive electrode layers 20 of the multilayer body 1 at a welded portion 20c. Similarly, the negative electrode tab 31 is welded and electrically connected to all the negative electrode layers 30. Furthermore, the positive electrode tab 21 is electrically connected to the positive electrode terminal 22, and the negative electrode tab 31 is electrically connected to the negative electrode terminal 32. As a result, the electrode layers constituting the multilayer body 1 are connected in parallel, so that a high-capacity solid-state battery can be obtained. In addition to the above, the multilayer body 1 having a columnar shape, and the positive electrode tabs 21 and the negative electrode tabs 31 can be constructed without providing extending portions of the electrode tabs, so that the above configuration can be housed in a cylindrical-shaped outer body with a space saved. As a result, the energy density of the solid-state battery can be improved, and restraining pressure can be uniformly applied to the electrode layers by the outer body.

Materials constituting the positive electrode tab 21 and the negative electrode tab 31 are not particularly limited, and the same metal materials constituting the positive current collector and the negative electrode current collector can be used, respectively.

Preferably, at least a part of the surface of the positive electrode tab 21 and the negative electrode tab 31 excluding a connection portion with respect to the electrode layer and the electrode terminal is insulation-processed or covered with an insulator. Thus, the short circuit of the solid-state battery 10 can be prevented. The method for insulation processing is not particularly limited, but examples thereof include a method of forming an insulating layer on the surface of the electrode tab by a metal oxide such as alumina or a solid electrolyte having insulating properties. The method for covering with an insulator is not particularly limited, and examples thereof include a method of covering the surface of the electrode tab with an insulating film.

(Electrode Terminal)

A positive electrode terminal 22 serving as an electrode terminal is disposed in contact with a positive electrode layer 20 disposed at one end portion of a multilayer body 1.

The positive electrode terminal 22 may be electrically connected to the positive electrode tab 21 by, for example, welding. Similarly, a negative electrode terminal 32 serving as an electrode terminal is disposed in contact with a negative electrode layer 30 disposed at the other end portion of the multilayer body 1. The negative electrode terminal 32 may be electrically connected to the negative electrode tab 31 by, for example, welding. Materials of the positive electrode terminal 22 and a negative electrode terminal 32 are not particularly limited as long as they have conductivity, but from the viewpoint of facilitating welding, the positive electrode terminal 22 is formed of the same metals as the positive electrode tab 21, and examples thereof include aluminum, stainless steel, and the like. Similarly, the negative electrode terminal 32 is preferably formed of the same metal as the negative electrode tab 31, and examples thereof include copper, stainless steel, and the like.

(Outer Body)

An outer body is a cylindrical-shaped outer body that houses multilayer body 1 as well as the positive electrode tab 21 and the negative electrode tab 31. The outer body is a sealing member for sealing the both end portions in the axial direction, and it may have a lid body. Materials for the outer body are not particularly limited, and, for example, a metal material can be used. When a metal material is used as the outer body, strong restraining pressure can be applied to the positive electrode layer 20 and the negative electrode layer 30. The above-mentioned metal material is not particularly limited as long as it can be used as an outer body for batteries, and examples thereof include aluminum, stainless steel, and the like. As the materials for the outer body, in addition to the above metal materials, resin such as synthetic resin can be used.

The lid body is not particularly limited as long as it can seal both end portions in the axial direction of the outer body. The positive electrode terminal 22 and a negative electrode terminal 32 may be used as the lid body. Preferably, the lid body has a configuration capable of moving from the outer side in the axial direction of the cylindrical-shaped outer body toward the center portion of the solid-state battery 10. When the lid body is moved as mentioned above, the positive electrode layer 20 and the negative electrode layer 30 are pressed via the lid body, so that a restraining pressure can be applied to the positive electrode layer 20 and the negative electrode layer 30. The outer body has a cylindrical shape. When the restraining pressure is applied from the axial direction mentioned above, uniform restraining pressure can be applied to the both ends, which are in contact with the lid, of the positive electrode layer 20 and the negative electrode layer 30. Therefore, even when the solid-state battery 10 is made into a module, a high restraining component is not required, and the energy density in the module unit can be improved. Furthermore, even at the side surfaces of the positive electrode layer 20 and the negative electrode layer 30, which are in contact with the inner peripheral surface of the outer package, uniform restraining pressure can be applied. When the uniform restraining pressure is applied as mentioned above, the internal resistance of the solid-state battery 10 can be made uniform, and as a result, the reaction rate of the battery reaction generated inside the solid-state battery 10 can be made uniform. At a result, preferable battery performance can be obtained. Furthermore, when the side surfaces of the positive electrode layer 20 and the negative electrode layer 30 are restrained, in the use of the solid-state battery 10 as a vehicle-mounted battery, vibration at the time when it is mounted on a vehicle and the lamination displacement at the time of collision can be prevented, and the breakage of the multilayer body can be suppressed, so that the high durability and the high safety of the solid-state battery 10 can be obtained.

<Method for Manufacturing Solid-State Battery 10>

A method for manufacturing a solid-state battery 10 is not particularly limited, but the method includes, for example, a filling step of filling a metal porous body with an electrode material mixture to form an electrode layer, and a welding step of welding an electrode tab to a multilayer body 1 obtained by laminating the electrode layer and a solid electrolyte layer and an electrode terminal.

The filling step is a step of impregnating pores of a metal porous body having a columnar shape with an electrode material mixture including an electrode active material, and forming an electrode layer. A method of filling the metal porous body with the electrode material mixture is not particularly limited, and examples of the method include a method for filling the inside of pores of the metal porous body with slurry including an electrode material mixture using a plunger-type die coater, while pressure is applied. In addition to the above, the inside of the metal porous body may be impregnated with an electrode material mixture by a dipping method.

The welding step is a step of winding the positive electrode tab 21 and the negative electrode tab 31 to the multilayer body 1 formed by laminating the electrode layer formed by the filling step and a solid electrolyte layer, and welding the electrode tabs and the electrode terminals disposed at both ends of each electrode layer and the multilayer body. The welding method is not particularly limited, and well-known methods can be used.

By housing the multilayer body 1 to which an electrode tab has been welded by the above-mentioned filling step and welding step in a cylindrical-shaped outer body, the solid-state battery 10 can be manufactured. A step of applying an appropriate restraining pressure to the multilayer body 1 housed in the cylindrical-shaped outer body from both end portions in the axial direction may be provided.

Hereinafter, another embodiment of the present invention is described. The same configuration as that of the above-mentioned first embodiment may be omitted.

<<Second Embodiment>>

Figure 4:
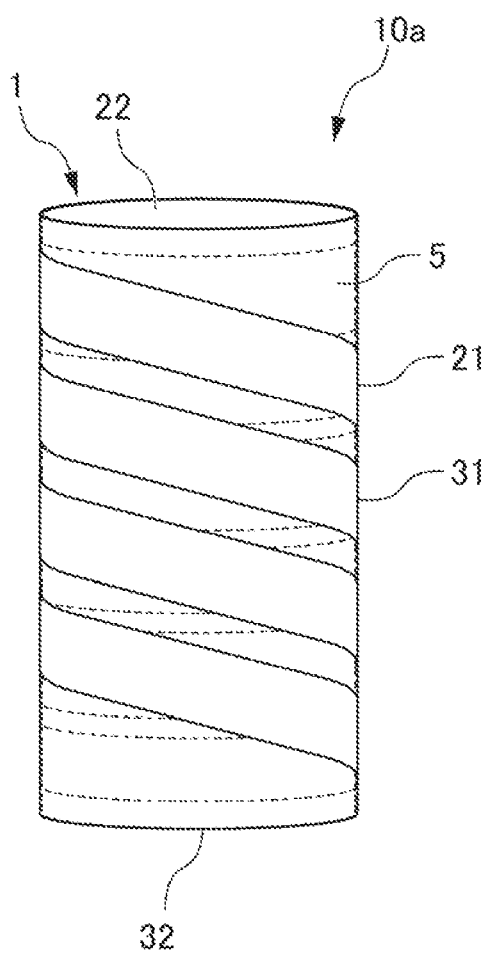
FIG. 4 is a perspective view showing a solid-state battery in accordance with a second embodiment of the present invention.

A solid-state battery 10a in accordance with this embodiment, as shown in FIG. 4, includes a multilayer body 1 and an insulating film 5 as an insulator on the outer peripheral surface of the multilayer body 1. The insulating film 5 is, for example, a belt-like member similar to a positive electrode tab 21 and a negative electrode tab 31. It is preferable that the positive electrode tab 21, the insulating film 5, and the negative electrode tab 31 are spirally wound on the outer peripheral surface of the multilayer body 1 sequentially in this order. This can preferably prevent short-circuit of the solid-state battery 10a. Furthermore, the insulating film 5 is preferably disposed on the outer peripheral surface in which the positive electrode tab 21 and the negative electrode tab 31 are not disposed in the outer peripheral surface of the multilayer body 1, and the insulating film 5 preferably has the same thickness as the positive electrode tab 21 and the negative electrode tab 31. This can reduce the level difference in the outer peripheral surface of the multilayer body 1, which is generated by the positive electrode tab 21 and the negative electrode tab 31, so that the outer body can apply uniform restraining pressure to the side surface portions of the positive electrode layer 20 and the negative electrode layer 30.

Materials forming the insulating film 5 are not particularly limited, and examples thereof include synthetic resin and the like as an example of insulating material to be filled in the material mixture unfilled portion 20b.

The insulating film 5 is only required to be disposed at least on the outer peripheral surface on which the positive electrode tab 21 and the negative electrode tab 31 are not disposed in the outer peripheral surface of the multilayer body 1. For example, the insulating film 5 may be disposed so as to cover a portion excluding a welded portion to the positive electrode tab 21 and the negative electrode tab 31 in the outer peripheral surface of the multilayer body 1. When the multilayer body 1 is wound on the positive electrode tab 21 and the negative electrode tab 31 after the multilayer body 1 has been covered with the insulating film 5 having the above-mentioned configuration and thereby, short circuit during manufacturing can be prevented. Alternatively, the positive electrode tab 21 and the negative electrode tab 31 are wound and welded to the multilayer body 1, and then the entire part may be covered with the insulating film 5. Thus, the manufacturing step can be simplified.

Figure 5:
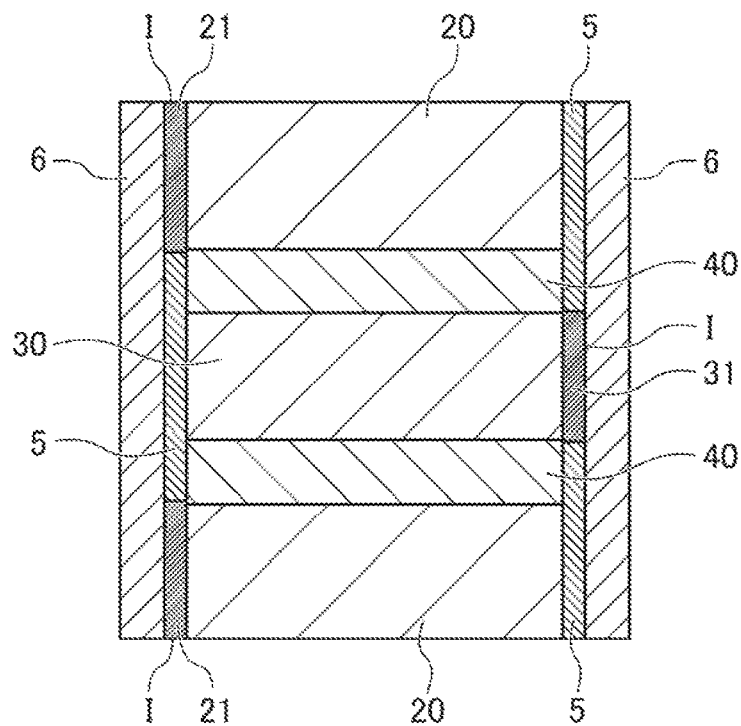
FIG. 5 is a sectional view showing a solid-state battery in accordance with the second embodiment of the present invention.
Figure 6:
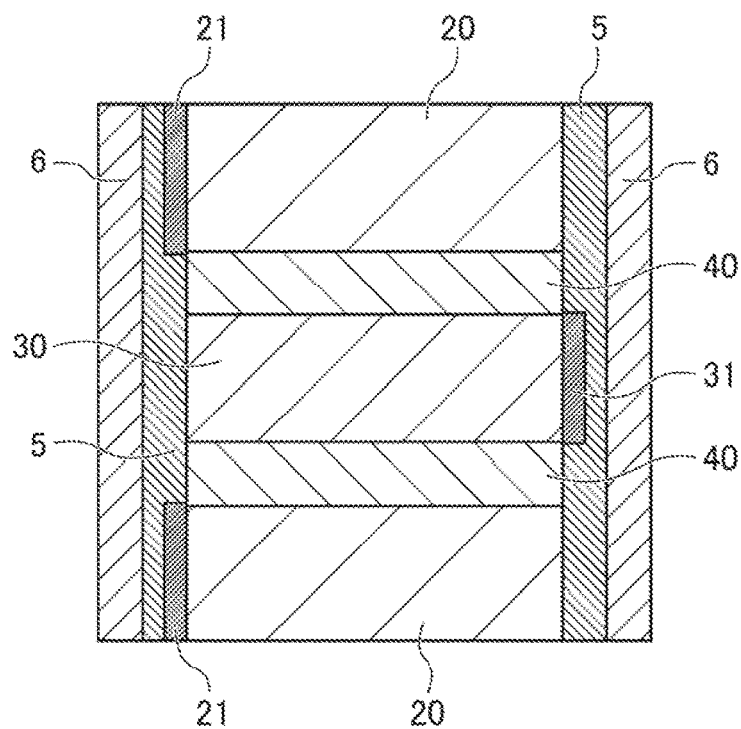
FIG. 6 is a sectional view showing a solid-state battery in accordance with the second embodiment of the present invention.
Figure 7:
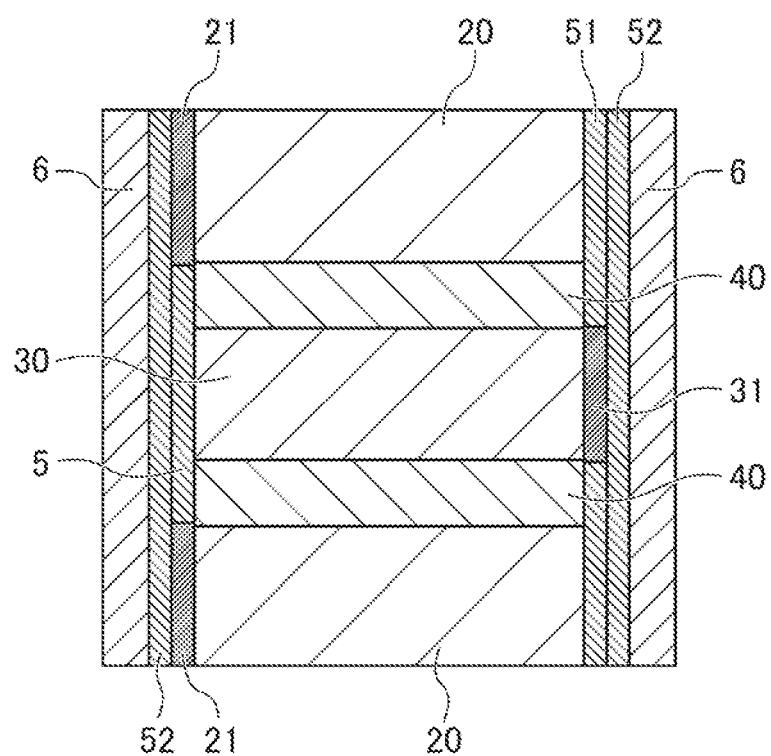
FIG. 7 is a sectional view showing a solid-state battery in accordance with the second embodiment of the present invention.

FIGS. 5, 6, and 7 are sectional views each showing an example in which the insulating film 5 is disposed on the outer peripheral surface of the multilayer body 1. FIG. 5 shows an example in which the insulating film 5 is disposed on the outer peripheral surface on which the positive electrode tab 21 and the negative electrode tab 31 are not disposed in the outer peripheral surface of the multilayer body 1. In this case, in order to prevent short circuit from occurring between the positive electrode tab 21 and the negative electrode tab 31, and the outer body 6, an insulating layer I is preferably provided on a surface in which the positive electrode tab 21 and the negative electrode tab 31 are brought into contact with the outer body 6.

FIG. 6 shows an example in which the insulating film 5 is disposed also between the positive electrode tab 21 and the negative electrode tab 31, and the outer body 6 in addition to the outer peripheral surface in which the positive electrode tab 21 and the negative electrode tab 31 are not disposed in the outer peripheral surface of the multilayer body 1. A configuration of FIG. 6 need not perform insulation treatment with respect to the outer surface of the positive electrode tab 21 and the negative electrode tab 31. The configuration of FIG. 6 is obtained by winding the positive electrode tab 21 and the negative electrode tab 31 on the multilayer body 1, and then covering the entire part with the insulating film 5.

Similar to FIG. 6, FIG. 7 shows an example in which an insulating film is disposed also between the positive electrode tab 21 and the negative electrode tab 31, and the outer body 6 in addition to the outer peripheral surface in which the positive electrode tab 21 and the negative electrode tab 31 are not disposed in the outer peripheral surface of the multilayer body 1. The configuration of FIG. 7 is divided into the insulating films 51 and 52, and after the insulating film 51 is wound, the positive electrode tab 21 and the negative electrode tab 31 are wound, and thereby, short circuit during manufacturing can be prevented. Thereafter, the insulating film 52 is wound so as to cover the outer surfaces of the positive electrode tab 21 and the negative electrode tab 31, so that it is not necessary to perform insulating treatment with respect to the outer surfaces of the positive electrode tab 21 and the negative electrode tab 31.

In the above, the preferable embodiments of the present invention are described. The present invention is not necessarily limited to the above embodiments and can be appropriately modified.

EXPLANATION OF REFERENCE NUMERALS 10, 10a solid-state battery
1 multilayer body
20 positive electrode layer
21 positive electrode tab
22 positive electrode terminal
30 negative electrode layer
31 negative electrode tab
32 negative electrode terminal
40 solid electrolyte layer
5 insulating film (insulator)

What is claimed is:

1. A solid-state battery comprising:
a multilayer body comprising a stack of a plurality of electrode layers including positive electrode layers and negative electrode layers and solid electrolyte layers each disposed between the electrode layers,
the multilayer body having a columnar shape;
the solid-state battery comprising:
a positive electrode terminal and a negative electrode terminal disposed at both end portions of the multilayer body;
a positive electrode tab electrically connected to the positive electrode layer and the positive electrode terminal;
a negative electrode tab electrically connected to the negative electrode layer and the negative electrode terminal,
wherein each of a plurality of the positive electrodes connects with the positive electrode tab at an outer peripheral surface of the positive electrode layer,
wherein each of a plurality of the negative electrodes connects with the negative electrode tab at an outer peripheral surface of the negative electrode layer; and
wherein the positive electrode tab and the negative electrode tab are spirally wound on an outer peripheral surface of the multilayer body.

2. The solid-state battery according to claim 1, wherein the positive electrode tab and the negative electrode tab have an at least partially insulated surface or a surface at least partially covered with an insulator.

3. The solid-state battery according to claim 1, wherein the positive electrode layer and the negative electrode layer include a current collector made of a metal porous body.

4. The solid-state battery according to claim 3, wherein the positive electrode tab and the negative electrode tab are welded to the current collector.

5. The solid-state battery according to claim 4, wherein a material mixture unfilled portion, in which the current collector is not filled with an electrode material mixture, is provided in the outer periphery in the diameter direction of the electrode layers, and
the positive electrode tab and the negative electrode tab are welded to the current collector in the material mixture unfilled portion.

6. The solid-state battery according to claim 1, wherein a first insulator is disposed on at least an outer peripheral surface of the multilayer body, in which the positive electrode tab and the negative electrode tab are not disposed, wherein the first insulator, the positive electrode tab and the negative electrode tab have at least a part of a surface thereof covered by a second insulator.

7. The solid-state battery according to claim 2, wherein the positive electrode tab and the negative electrode tab have at least part of a surface thereof insulation treated, and a third insulator is disposed on at least an outer peripheral surface at which the positive electrode tab and the negative electrode tab are not disposed of the multilayer body.

8. The solid-state battery according to claim 2, wherein the positive electrode tab and the negative electrode tab have at least part of a surface thereof covered by the insulator, wherein the insulator is disposed at least one an outer peripheral surface at which the positive electrode tab and the negative electrode tab are not disposed of the multilayer body.

\* \* \* \* \*